Jan. 4, 1955

W. L. MORGAN 2,698,594

SIGNALING MIRROR

Filed Feb. 28, 1952

Inventor
Willard L. Morgan
By Nobbe & Swope
Attorneys

Jan. 4, 1955    W. L. MORGAN    2,698,594
SIGNALING MIRROR
Filed Feb. 28, 1952    3 Sheets-Sheet 2
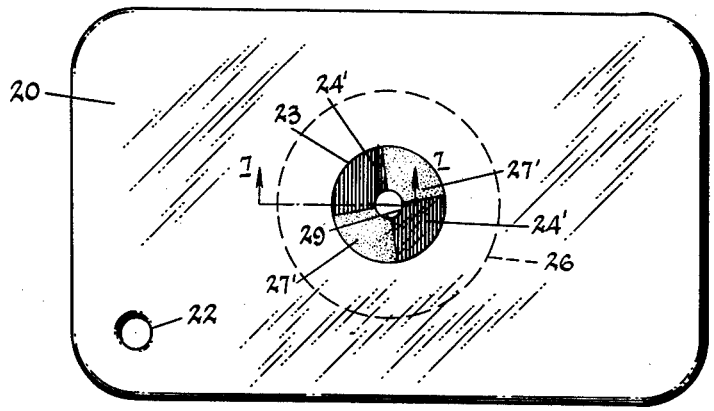
Fig. 5
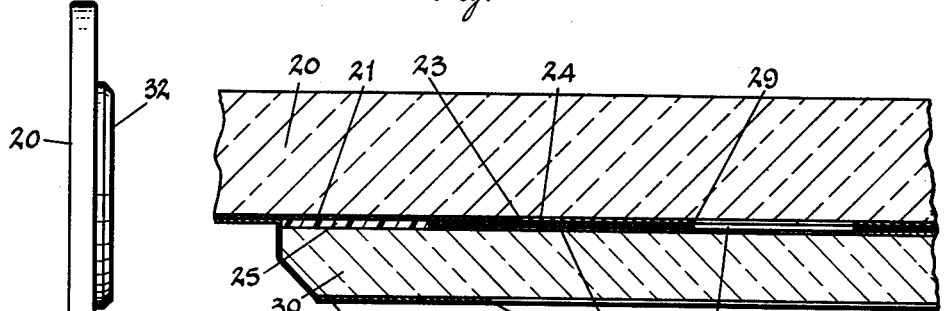
Fig. 6    Fig. 7
Fig. 9    Fig. 10
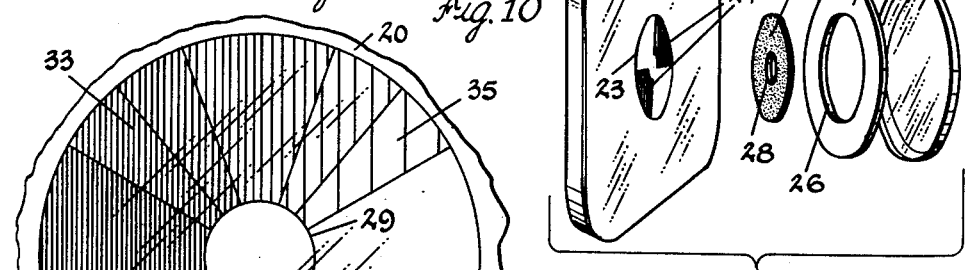
Fig. 8
Fig. 11
Inventor
Willard L. Morgan
Nobbe & Swope
Attorneys Jan. 4, 1955         W. L. MORGAN         2,698,594
                    SIGNALING MIRROR
Filed Feb. 28, 1952                    3 Sheets-Sheet 3

Inventor
Willard L. Morgan
Nobbe & Swope
Attorneys

United States Patent Office 2,698,594
Patented Jan. 4, 1955

2,698,594

SIGNALING MIRROR

Willard L. Morgan, Pittsburgh, Pa., assignor to Libbey-Owens-Ford Glass Company, Toledo, Ohio, a corporation of Ohio Application February 28, 1952, Serial No. 273,922

5 Claims. (Cl. 116—20)

This invention relates broadly to emergency signaling devices for sending distress signals by reflecting sunlight to desired targets. In particular, it relates to an improved signaling mirror and method for its use wherein the target may be more readily located and more accurately aimed upon.

Signaling mirrors of this type have been used principally by persons in distress for attracting the attention of potential rescuers. Due to the conditions under which they are generally used, it is necessary that they be small, compact and simplified in construction. In using them, a duel operation is involved. That is, the mirror must first be held in such a manner that the sun's rays fall on the reflecting surface thereof and must then be aimed or oriented in such a manner that the rays falling thereon are reflected onto the target.

Basically then, these signaling mirrors comprise a highly reflective mirror surface for reflecting the sun's rays falling thereon and thereby producing a signal, as well as means associated therewith for readily and accurately aiming said reflected rays or signal at the target. The aiming means normally comprises a retroreflective surface positioned over and behind a clear, transparent space in the mirror surface for retroreflecting, through a sighting hole therein, certain of the rays falling on said retroreflective surface to the eye of the observer. Thus, a virtual image of the sun is presented to the eye of the observer, in a manner well known in the signaling mirror art and to be hereinafter explained more in detail, such that the observer is enabled to aim the signal at the target. As a refinement, a partially transparent colored filter has frequently been used in this type of signaling mirror to reduce the brillance of the sun's rays as they are retroreflected as a virtual image to the eye of the observer. This filter has taken the form of a disc-like member disposed between the clear space in the mirror and the retroreflective surface so as to overlie and entirely cover said retroreflective surface.

Of course, the above description is but a general one and is not intended to cover all known varieties of this type of signaling mirror. Nor is it meant to be illustrative of the novelty of this invention, but merely to present a background by which the improvements contained in the invention can be more readily appreciated.

Heretofore, conventional signaling mirrors which did not employ a colored filter for reducing the brilliance of the sun's rays presented two problems. In the first place, the virtual image of the sun, or aiming spot as used herein, was found to be of such a large area and brilliance that superimposing the aiming spot on the comparatively small target for the purpose of reflecting the sun's rays thereon was very difficult. For example, when aiming at a target 9 or 10 miles away the observer would see superimposed upon the target an aiming spot of approximately 200 feet in diameter. Furthermore, due to the natural imperfections of the high-angularity retroreflective beads generally used on the retroreflective surface, the periphery of the aiming spot would appear fringed or fuzzy. Therefore, it was virtually impossible to accurately superimpose or "pin-point" the aiming spot on a target of, for example, the dimensions of an airplane or small ship.

It was, of course, the object of the aforementioned partially transparent colored filter to alleviate this first problem. As previously noted, said filter reduced the brilliance as well as the size of the spot or virtual image by entirely covering the retroreflective surface and thereby causing the aiming spot to take on color, such that the observer was able to see the target through the partially transparent and less brilliant spot. However, this solution to the first problem brought on a second. It was found that with the filter, under ordinary weather conditions, it was very difficult to see the colored and less brilliant aiming spot against the sky as the observer was preparing to orient the mirror so as to bring both the target and the aiming spot into view through the sighting aperture. In other words, although once located generally and approximately superimposed upon by the aiming spot, the target could be more accurately aimed upon, there was increased difficulty in the initial locating or "tracking" operation. Particularly was this found to be true in the case of rapidly moving targets such as aircraft. Thus, it was frequently necessary for the observer to first aim the mirror downwardly toward the ground or the sea to locate the partially transparent colored aiming spot before proceeding to superimpose the spot on the target. As a result of this procedure, the time of locating on the target was relatively slow and moving targets were frequently missed.

This invention is directed toward the solution of the above noted problems by providing a novel type of partially transparent, colored filter element which permits an observer to see a brilliant uncolored aiming spot or virtual image in generally locating the target and approximately superimposing an aiming spot thereon and, by means of a simplified turning or rotating of the mirror, a less brilliant, partially transparent and colored spot in "pin-pointing" or accurately superimposing the spot on the target. Thus, the device embodied in this invention overcomes both problems in a simplified but no less novel manner. To be more specific, instead of employing the conventional ring-shaped colored filter, this invention contemplates the use of a partial ring type filter. In other words, the filter rather than entirely covering the retroreflective surface is of such shape that it covers only a part or parts of said surface.

Two forms of filters embodying this invention have been illustrated, by way of example, in the drawings. In one form the filter is semi, split or partial ring shape, and in the other form it is composed of two diametrically opposed segmental portions. It is to be understood, of course, that these forms are merely for purposes of illustration and that this invention contemplates a filter of a variety of shapes or forms which only partially cover the retroreflective surfaces. As will be explained in detail subsequently, it is by means of the adjacent covered and uncovered portions of the retroreflective surface that the observer is enabled to quickly locate the aiming spot and the target through the sighting aperture as well as to accurately superimpose the spot on the target.

As a further refinement on the improved signaling mirror of this invention, it is contemplated that the partial ring type filter be made in such a manner as to be adaptable to various sky conditions. For instance, on especially dull and cloudy days, by means of color gradations on the filter, the observer is enabled to select a relatively light shade of color in accurately superimposing the spot on the target while, on the other hand, on very bright and sunny days, he is enabled to select a relatively dark shade. This improvement is accomplished by means of a partial ring type filter which is composed of a plurality of adjacent colored segments varying from a dark to a light shade of the particular color used, and in which the adjacent segments are so arranged thereon that, by means of the simplified mirror turning operation aforementioned, the observer is able to select the shade best suited for prevailing sky conditions.

It is, therefore, an object of this invention to provide an improved signaling mirror wherein the colored filter therefor is so shaped and arranged that a target may be more readily and speedily located generally and approximately aimed upon and then more accurately aimed upon.

Another object of this invention is to provide an improved signaling mirror wherein the colored filter therefor is so shaped and arranged that the mirror may be oriented in such a manner as to alternately present to the observer's eye a brilliant uncolored aiming spot and a less brilliant, partially transparent colored aiming spot.

Another object of this invention is to provide an improved signaling mirror wherein the colored filter therefor is of such character that the target may be more accurately aimed upon under a variety of sky conditions.

Another object of this invention is to provide an improved signaling mirror wherein the colored filter therefor is so constructed that the mirror may be oriented in such a manner as to selectively present to the observer's eye colored aiming spots of different shades and brilliances.

Still another object of this invention is to provide a method for reflecting sunlight to desired targets wherein the target may be more readily located and more accurately aimed upon.

Other objects and advantages will become more apparent during the course of the following description when taken in connection with the accompanying drawings.

In the accompanying drawings, wherein like numerals are employed to designate like parts throughout the same:

Fig. 5 is a plan view of an alternative form of signaling mirror constructed in accordance with this invention;

Fig. 6 is a side view of the mirror shown in Fig. 5;

Fig. 7 is an enlarged fragmentary sectional view taken substantially on line 7—7 of Fig. 5;

Fig. 8 is an "exploded" view of the mirror of Figs. 5, 6 and 7, illustrating the arrangement of the respective parts;

Fig. 9 is a plan view of one form of separable filter element;

Fig. 10 is a plan view of another form of separable filter element;

Fig. 11 is a detail plan view of a modified form of filter; and

Figure 1:
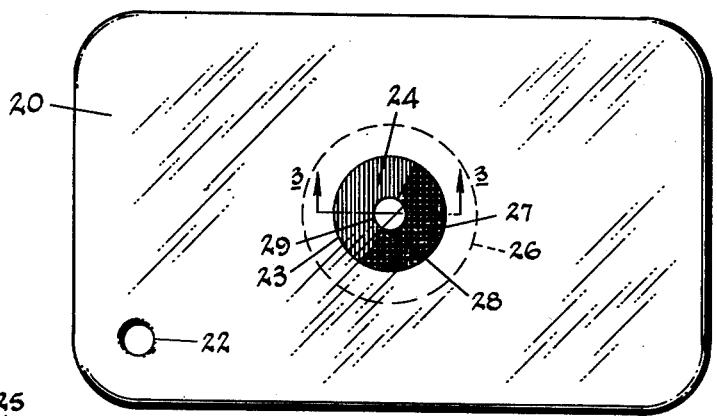
Fig. 1 is a plan view of a signaling mirror constructed in accordance with this invention.
Figures 2, 3:
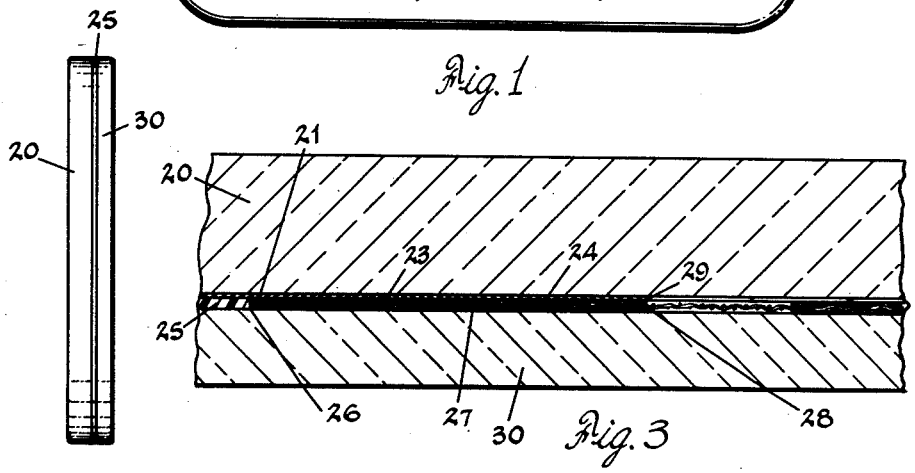
Fig. 2 is a side view of the mirror shown in Fig. 1.
Fig. 3 is an enlarged fragmentary sectional view taken substantially on line 3—3 of Fig. 1.

Referring now to the drawings, and particularly to Figs. 1–4, there is illustrated an improved signaling mirror comprising a rectangular mirror 20 of plate glass, tempered glass, or other suitable transparent, refractive material, to a substantial part of the back of which is applied a metallic mirror coating 21, preferably of silver, aluminum or chromium. In a corner or near an edge of the mirror 20, is a hole 22 through which may be looped a lanyard or other suitable means for carrying the mirror.

Figure 4:
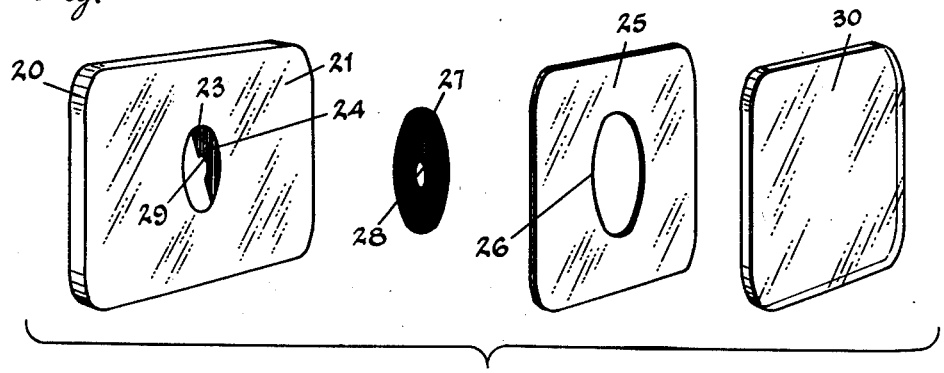
Fig. 4 is an "exploded" view of the mirror of Figs. 1, 2 and 3, illustrating the arrangement of the respective parts.

As best shown in Fig. 4, the entire rear surface of the mirror is coated with the exception of a small circular portion which is left uncoated to form a window 23. Within the boundary of window 23 and on the uncoated portion of mirror 20, there is applied a partially transparent, integral colored filter element 24 which may be in the form of a coating painted or stenciled on said uncoated surface of said window as in Fig. 4 or alternatively, as illustrated in Fig. 10, the filter may be in the form of a separable thin colored sheet 24a which is placed over and adjacent to said window. In either case, the filter is of a semi, split or partial ring shape or of at least two partial ring shapes as, for example, the opposed segmental portions 24' and 24b of Figs. 5 to 9, such that an area of window 23 is only partially covered by the filter. It is preferred that the filter element be of a clear red or other bright, partially transparent color.

Positioned adjacent to and in back of the coating 21 of mirror 20 is a washer 25 of a thermoplastic resin, such as polyvinyl butyral, or other suitable bonding material and conforming to the rectangular shape of said mirror. Received within and retained by the opening 26 in washer 25 is a retroreflective surface or element 27 which may be in the form of a wire mesh screen upon the strands of which are supported "Scotchlite" type beads having high-angularity retroreflective surfaces, similar to those shown in Patent No. 2,557,108, and as illustrated in Figs. 1 to 4. Alternatively, the retroreflective surface may take the form of a sheet material such as paper onto the surface of which are secured a similar type of beads, as illustrated at 27' in Figs. 5 to 8. Sheets of this latter type which have been found satisfactory for the purposes of this invention are manufactured by Minnesota Mining and Manufacturing Company under the trade name "Scotchlite."

In Fig. 1, the opening 26 in washer 25 and the periphery of retroreflective surface 27 are shown in broken lines and a portion of said retroreflective surface is seen through window 23, when viewed from the front of the mirror, while another portion is covered by the partially transparent filter 24. The retroreflective surface is shown as being somewhat larger than the window 23 and the marginal portion thereof overlies said window and is covered by mirror coating 21. Located centrally of member 27 is a circular sighting aperture 28 which corresponds to a semicircular notch or cut-out portion 29 of filter 24. When assembled, as in Fig. 1, the sighting aperture 28 is in alignment with said cut-out portion 29 of the filter and is located centrally of window 23.

Positioned adjacent to and rearwardly of washer 25 is a retaining plate 30 of transparent material such as glass conforming to the rectangular shape of mirror 20 and washer 25. Mirror 20, washer 25 and retaining plate 30 are preferably bonded together in air tight relation in any suitable manner.

In an alternative form of this invention, as illustrated in Figs. 5 to 8, the plastic washer 25 and retaining plate 30 are shown as being cylindrical in shape rather than conforming to mirror 20 and are disposed centrally of the edges of said mirror. Consequently, the profile of this form differs from that previously described, as can be seen by a comparison of Figs. 2 and 6. Furthermore, as previously mentioned, retroreflective member 27' as illustrated in this form of signaling mirror, comprises simply a disc-like member of sheet material such as paper with the retroreflective beads embedded therein. Alternatively, of course, the retroreflective member may comprise a wire mesh screen with the "Scotchlite" type beads supported thereon, as illustrated at 27 in the form of the invention in Figs. 1 to 4.

As a further alternative, the colored filter may take the form of either a separable element 24b (Fig. 9) or a painted or stenciled coating 24' on mirror 20, as in Figs. 5 to 8. Washer 25, retaining plate 30 and mirror 20 are preferably bonded together as described above to form a composite unit. The edges and exposed portion of metallic coating 21 of mirror 20 as well as all but a windowed portion 31 through the back portion of the retaining plate may be covered with a coating of opaque black paint 32. This coating serves not only to protect the metallic coating 21 on mirror 20 from salt spray and other corrosive effects but also provides a dark surface upon which instructions may be printed.

In Fig. 11, there is illustrated a modified type of colored filter element 33, which may be used with either of the forms of signaling mirror shown and also may be formed integrally with the mirror 20 as shown in said figure or as a separable element. This filter may be of the partial ring type similar to filters 24 and 24a but is composed of adjacent segmental areas of different shades of the particular color used, which areas are arranged radially from the center of notch 29, such that a portion of each area, upon assembly of the signaling mirror, is contiguous to sighting aperture 28 as well as that portion of window 23 over which said sighting aperture lies. The area 34 may, for example, be a relatively dark shade of the color and area 35 a relatively light shade thereof, with the areas therebetween being shades intermediate of the two.

The different shades may be produced in a variety of ways such as by cross-hatching or by vignetting with printed half tone dots, so as to provide a filter composed of a plurality of separate areas of different shades which may be used selectively for all types of sky conditions, as previously noted. Alternatively, the separate areas may be stenciled onto the mirror with a silk screen using inks of progressively lighter or deeper shades.

Figure 12:
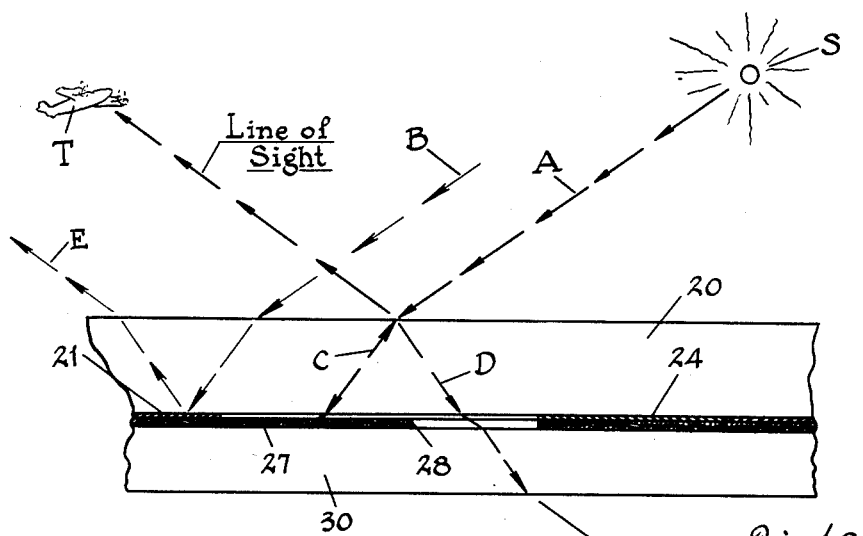
Figs. 12, 13 and 14 are views showing the application of the mirror when signaling an airplane or other desired target.
Figure 13:
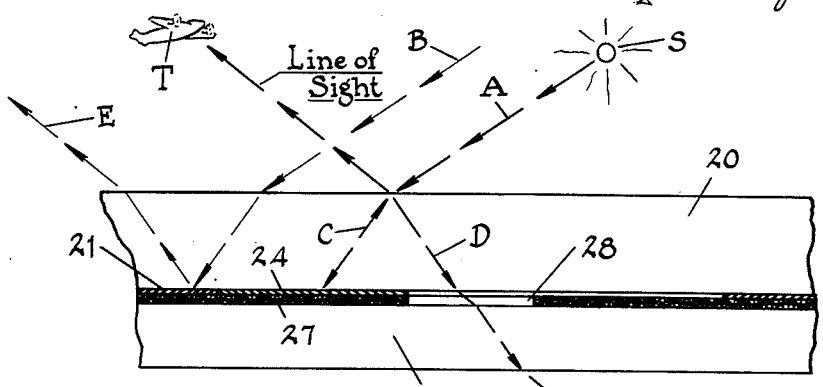
Figure 14:
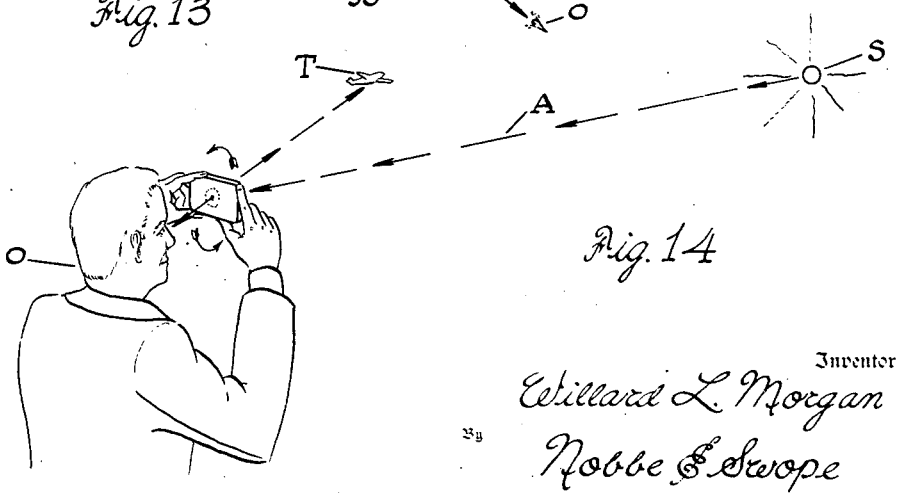

There is shown in Figs. 12, 13 and 14, the method for using the form of the invention illustrated in Figs. 1 to 4 wherein the filter is composed of a single semi or partial ring shaped element. The signaling mirror is held by the observer O in such a manner that his eye is directly behind sighting aperture 28, as best shown in Fig. 14, and shielded behind mirror 20 at the back of the metallic coating 21 from the sun's rays, such as A and B and others similar and parallel thereto. Certain of the sun's rays such as B are falling on the front surface of mirror 20, and are being reflected from the mirror coating 21 as at E. The observer also holds the mirror in such a way that a portion of the retroreflective surface 27 not covered by the colored filter is disposed toward the target T and away from the sun S (Fig. 12). Thus, ray A and others similar and parallel thereto, in being retroreflected from retroflective surface 27 as at C, do not strike the filter 24 before being reflected from front surface of the mirror as at D to the eye of the observer and, therefore, the virtual image or aiming spot will be brilliant and uncolored.

The front surface of the mirror is then faced so that the axis of the sighting aperture 28 will lie approximately between the target T and the sun S and on a straight line therebetween. The mirror is held in this approximate position while the observer looks through the sighting aperture to locate the target. At the same time, the observer will see a virtual image of the sun or the aiming spot, which, with the mirror held in the position of Fig. 12, will be brilliant and uncolored and thus easy to see against the sky, as previously explained. When the mirror has been properly faced so that both the target and the aiming spot can be seen through the sighting aperture, the observer need only orient the mirror back and forth until the spot is approximately superimposed upon the target.

As previously noted, it is at this point of the aiming operation that the less brilliant and partially transparent aiming spot is preferred. That is, the target which presents a rather small image is to at least some extent obscured by the brilliant aiming spot which is large and has a fuzzy appearance around its periphery. Therefore, the mirror is slowly turned on the axis of sighting aperture 28, as shown by the arrows in Fig. 14, so that a portion of retroreflective surface 27 covered by the filter will be disposed toward the target and away from the sun (Fig. 13). In this position, the aiming spot will appear to be colored as ray A from the sun is now striking the colored filter in being retroreflected as at C to the front surface of the mirror and reflected as at D to the eye of the observer, in a manner previously described. Thus, the observer sees a less brilliant, partially transparent colored aiming spot and is enabled thereby to "pin-point" the spot onto the target, at which time a signal is reflecting from the mirror coating onto the target by means of ray E and others similar and parallel thereto.

From the foregoing, it is believed that the mode of operation of the form of signaling mirror of Figs. 5 to 8 is apparent. The edges of the filters 24' adjacent the uncovered portions of retroreflective surface 27' are preferably disposed in non-parallel relation with respect to the vertical and horizontal edges of the mirror so that only a slight turning of the mirror on the axis of the sighting aperture 28 is necessary to change the virtual image from a brilliant uncolored spot to a less brilliant, colored and partially transparent one. That is, said edges are so disposed that upon only a slight turning, an uncovered portion of retroreflective surface 27' disposed toward the target will be replaced by a portion thereof covered by the filter at which time then the mirror will be in its most convenient, horizontally disposed position for aiming, as shown in the drawings.

It is further believed that the advantages of the modified form of filter 33 are also more readily apparent in the light of the foregoing description. That is, during the aforementioned turning of the mirror on the axis of sighting aperture 28, the observer is able to select any one of a variety of shaded areas, varying from light to dark gradations of the particular color used, which are best suited to prevailing sky conditions.

It is to be understood that the forms of the invention disclosed herein are to be taken as the preferred embodiment thereof, and that various changes in the shape, size and arrangement of parts may be resorted to without departing from the spirit of the invention or the scope of the following claims.

I claim:

1. A mirror signaling device for reflecting sunlight to a desired target, comprising a transparent support, an opaque mirror coating upon one surface of said support provided with an open space therein, a retroreflective element of reduced light transmission in back of said mirror coating covering said open space and cooperating with a forwardly spaced surface of said support for reflecting a bright virtual image of the sun to the eye, a colored filter located between said support and said retroreflective element covering only a portion of the retroreflective element and coacting with the covered portion of said retroreflective element to cause said covered portion to reflect images of reduced intensity, a clear, open sighting aperture through said retroreflective element and filter and registering with said open space for viewing said virtual image and for superimposing the said image upon said target to aim a reflected light signal from said mirror coating upon said target, said uncovered portion of said retroreflective element producing a bright virtual image in one position of the mirror to enable rapid locating of the target within the aperture, and said retroreflective element and colored filter cooperating to produce a virtual image of reduced light intensity when said mirror is rotated in its own plane to bring the reduced intensity virtual image into view in the aperture and enable the final exact superimposing of said reduced image upon the target to aim the reflected light signal from the mirror coating at said target.

2. A mirror signaling device of the character defined in claim 1, in which the filter is of a uniform color.

3. A mirror signaling device of the character defined in claim 1, in which the colored filter is composed of areas of different light transmissions providing a selection of solar image intensities upon rotation of the mirror in its own plane to enable quick accurate aiming of the mirror under varied sunlight conditions.

4. A mirror signaling device of the character defined in claim 1, in which the filter is substantially semi-circular in shape.

5. A mirror signaling device of the character defined in claim 1, in which the filter comprises at least two separated segmental portions.

References Cited in the file of this patent

UNITED STATES PATENTS

| | | |
|---|---|---|
| 1,278,302 | Campbell | Sept. 10, 1918 |
| 1,676,760 | Wilson | July 10, 1928 |
| 1,846,054 | Hockstetter | Feb. 23, 1932 |
| 2,412,616 | Hunter | Dec. 17, 1946 |
| 2,557,108 | Hunter | June 19, 1951 |